May 5, 1925.  1,536,775

E. P. CONWELL

EVEN FEED ACCELERATOR

Filed July 23, 1924

Inventor
Eddie P. Conwell.

By Clarence A. O'Brien
Attorney

Patented May 5, 1925.

1,536,775

UNITED STATES PATENT OFFICE.

ELDIE P. CONWELL, OF ALLERTON, IOWA.

EVEN-FEED ACCELERATOR.

Application filed July 23, 1924. Serial No. 727,739.

*To all whom it may concern:*

Be it known that I, ELDIE P. CONWELL, a citizen of the United States, residing at Allerton, in the county of Wayne and State of Iowa, have invented certain new and useful Improvements in Even-Feed Accelerators, of which the following is a specification.

This invention relates to even feed accelerators, and it consists in the novel features hereinafter described and claimed.

An object of the invention is to provide an even feed accelerator of simple and durable structure, and adapted to be connected with the butterfly valve of a carburetor of an automobile engine, and having means adapted to be positioned upon the floor board of an automobile machine, and which may be operated by the foot of the driver of the machine, to accelerate or regulate the flow of mixture from the carburetor to the intake manifold of the engine.

With the above object in view, the structure includes a bracket member adapted to be applied to the engine, and having a shaft journalled therein, and which passes through the dash board of the automobile machine. The shaft is provided at its rear end with an angularly disposed arm, upon which a foot piece is mounted. The said member is adapted to rest upon the floor board of the body of the automobile machine. The said shaft also carries, at a point between its ends, an arm having an angularly disposed extremity, which is connected with the pull rod of the butterfly valve. Links are connected with said rod and also connected with the regular lever means for operating the said rod and the valve.

Figure 1:
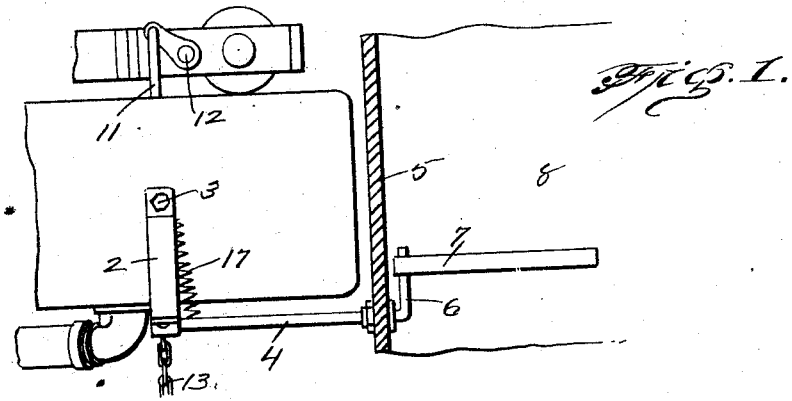
Figure 1 is a top plan view of the accelerator.
Figure 2:
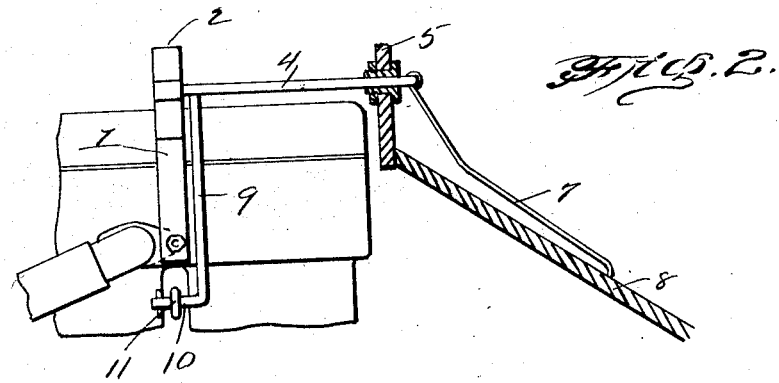
Figure 2 is a side elevational view of the same.
Figure 3:
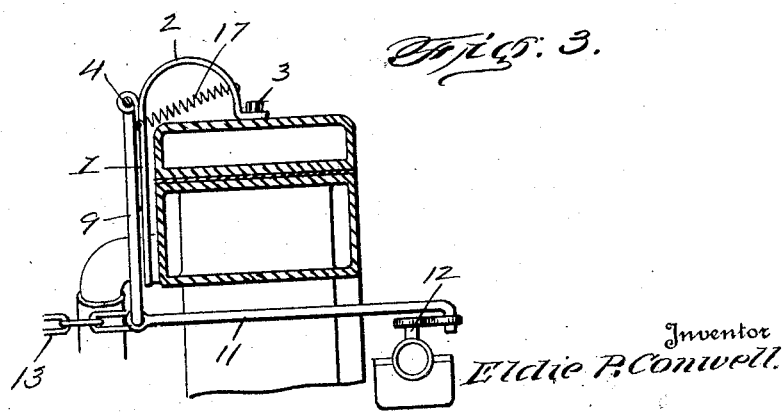
Figure 3 is a transverse sectional view, through the upper portion of an engine of an automobile machine, and showing the accelerator applied.

As illustrated in the accompanying drawings, the accelerator comprises a bracket 1 having angularly disposed end portions and intermediate arched portions 2. The end portions 3 of the bracket 1 are secured to the engine by means of bolts 3. A shaft 4 is journalled at one end in the bracket 1, and passes transversely through the dash board 5 of the automobile machine, and is provided at its rear end with an angularly disposed arm 6. A foot piece 7 is hinge jointed upon the arm 6, and its rear end is adapted to rest upon the upper surface of the floor board 8 of the automobile machine. The shaft 4 is provided at a point between its ends with an arm 9, having an angularly disposed extremity 10. The extremity 10 is pivotally connected with the pull rod 11, which in turn is operatively connected with the butterfly valve stem 12, in a usual manner. Links 13 are also connected with the arm 9 and rod 11 and may be connected with the regular hand operated lever on the automobile (not shown), and whereby the valve may be operated by hand. It is apparent that when the driver of an automobile machine places his foot on the floor beside the foot piece 7 and moves it to the left, the shaft 4 is turned, whereby the arm 9 is swung and the rod 11 is moved longitudinally, whereby the valve stem 12 is turned, and consequently the passageway through the manifold pipe is increased or diminished, and a greater or smaller supply of the mixture may pass from the carburetor, into the intake manifold of the engine. Thus, the operation of the engine may be accelerated by the driver of the automobile machine, who may use his foot, instead of his hand, to control the operation of the engine.

The foot piece 7 is instantly turned up against coil box out of the way whenever the floor boards need to be removed.

When the boards are replaced the foot piece 7 is returned to its original position.

Having described the invention, what is claimed is:

1. An accelerator comprising a bracket member having angularly disposed end portions and provided with an arched intermediate portion, a shaft journalled in the bracket member and having an angularly disposed arm, a foot piece hinge jointed upon the arm, a second arm mounted upon the shaft, a spring connecting the second mentioned arm with the arched portion of the bracket, the last mentioned arm having an angularly disposed extremity, adapted to be pivotally connected with the pull rod of the butterfly valve controlling mechanism of the automobile machine.

2. An accelerator comprising a bracket, having angularly disposed end portions and an intermediate arched portion, a shaft journalled upon the bracket member, and having at its rear end an angularly disposed arm, a foot piece hinge jointed upon the arm and adapted to rest upon the floor of the automobile machine, a second arm depending from said shaft and provided at its lower end with an angularly disposed extremity, adapted to be connected with the pull rod of the butterfly valve mechanism of the automobile machine, and a spring connected at one end with the arched portion of the bracket and connected at its other end with the intermediate portion of the last mentioned arm.

In testimony whereof I affix my signature.

ELDIE P. CONWELL.